United States Patent
Mandy et al.

(10) Patent No.: US 7,881,563 B2
(45) Date of Patent: Feb. 1, 2011

(54) DISTORTION CORRECTION OF IMAGES USING HYBRID INTERPOLATION TECHNIQUE

(75) Inventors: Arnaud Mandy, Tampere (FI); Juha Särkijärvi, Tampere (FI)

(73) Assignee: Nokia Corporation, Espoo (FI)

( * ) Notice: Subject to any disclaimer, the term of this patent is extended or adjusted under 35 U.S.C. 154(b) by 1062 days.

(21) Appl. No.: 11/355,919

(22) Filed: Feb. 15, 2006

(65) Prior Publication Data

US 2007/0188633 A1    Aug. 16, 2007

(51) Int. Cl.
G06K 9/32 (2006.01)
G06K 9/40 (2006.01)
G06K 9/00 (2006.01)
H04N 5/217 (2006.01)

(52) U.S. Cl. .............. 382/300; 382/274; 382/167; 348/241

(58) Field of Classification Search .............. None
See application file for complete search history.

(56) References Cited

U.S. PATENT DOCUMENTS

| | | | | |
|---|---|---|---|---|
| 4,463,380 A * | 7/1984 | Hooks, Jr. | | 348/580 |
| 5,142,357 A * | 8/1992 | Lipton et al. | | 348/48 |
| 5,218,671 A * | 6/1993 | Liao et al. | | 345/595 |
| 5,237,402 A * | 8/1993 | Deshon et al. | | 358/520 |
| 5,712,890 A * | 1/1998 | Spivey et al. | | 378/37 |
| 5,748,768 A * | 5/1998 | Sivers et al. | | 382/130 |
| 5,764,795 A * | 6/1998 | Takeo et al. | | 382/167 |
| 5,778,106 A * | 7/1998 | Juenger et al. | | 382/275 |
| 5,883,985 A * | 3/1999 | Pourjavid | | 382/274 |
| 5,990,950 A * | 11/1999 | Addison | | 348/273 |
| 5,991,437 A * | 11/1999 | Migdal et al. | | 382/154 |
| 6,088,062 A | 7/2000 | Kanou et al. | | |
| 6,304,671 B1 * | 10/2001 | Kakutani | | 382/167 |
| 6,373,991 B1 * | 4/2002 | Shimazu et al. | | 382/266 |
| 6,415,065 B1 * | 7/2002 | Miyake | | 382/300 |
| 6,487,309 B1 * | 11/2002 | Chen | | 382/162 |
| 6,535,651 B1 * | 3/2003 | Aoyama et al. | | 382/300 |
| 6,538,691 B1 * | 3/2003 | Macy et al. | | 348/222.1 |
| 6,628,827 B1 * | 9/2003 | Acharya | | 382/167 |
| 6,630,929 B1 * | 10/2003 | Adler et al. | | 345/177 |
| 6,714,688 B1 * | 3/2004 | Gallagher et al. | | 382/266 |
| 6,724,945 B1 * | 4/2004 | Yen et al. | | 382/274 |
| 6,804,406 B1 * | 10/2004 | Chen | | 382/254 |

(Continued)

FOREIGN PATENT DOCUMENTS

GB    2343579 A    5/2000

(Continued)

OTHER PUBLICATIONS http://epaperpress.com/ptlens/title.html Tom Niemann, Portland, Oregon, Jan. 30, 2006.

(Continued)

*Primary Examiner*—Vikkram Bali
*Assistant Examiner*—Michelle Entezari (57) ABSTRACT

The specification and drawings present a new method system, apparatus and software product for correcting a geometrical distortion of an image using a hybrid interpolation technique by a digital image processor. After calculating corrected coordinates of the pixels in the image, the interpolation of color components of the pixels can be performed by using the corrected coordinates, wherein at least one color component is interpolated using a quality which is different from quality interpolators used for other color components.

39 Claims, 4 Drawing Sheets

U.S. PATENT DOCUMENTS

| | | | | |
|---|---|---|---|---|
| 6,838,651 B1* | 1/2005 | Mann | | 250/208.1 |
| 6,853,748 B2* | 2/2005 | Endo et al. | | 382/167 |
| 6,978,050 B2* | 12/2005 | Hunter et al. | | 382/275 |
| 6,990,249 B2* | 1/2006 | Nomura | | 382/254 |
| 7,072,084 B2* | 7/2006 | Shirasawa | | 358/525 |
| 7,102,669 B2* | 9/2006 | Skow | | 348/222.1 |
| 7,155,058 B2* | 12/2006 | Gaubatz et al. | | 382/167 |
| 7,190,487 B2* | 3/2007 | Dalrymple et al. | | 358/1.9 |
| 7,200,279 B1* | 4/2007 | Lin | | 382/274 |
| 7,224,392 B2* | 5/2007 | Cahill et al. | | 348/315 |
| 7,239,758 B2* | 7/2007 | Tsuda | | 382/275 |
| 7,373,020 B2* | 5/2008 | Tsukioka | | 382/300 |
| 7,409,084 B2* | 8/2008 | Jung | | 382/167 |
| 7,492,396 B2* | 2/2009 | Kim et al. | | 348/234 |
| 7,499,587 B1* | 3/2009 | Hamburg | | 382/167 |
| 7,595,921 B2* | 9/2009 | Ito et al. | | 358/519 |
| 7,646,507 B2* | 1/2010 | Ono | | 358/1.9 |
| 2001/0055390 A1* | 12/2001 | Hayashi et al. | | 380/220 |
| 2002/0027608 A1* | 3/2002 | Johnson et al. | | 348/383 |
| 2002/0041383 A1* | 4/2002 | Lewis et al. | | 358/1.9 |
| 2002/0070342 A1* | 6/2002 | Berenz et al. | | 250/353 |
| 2002/0118964 A1* | 8/2002 | Enomoto | | 396/60 |
| 2003/0031375 A1* | 2/2003 | Enomoto | | 382/255 |
| 2003/0086026 A1* | 5/2003 | Kim | | 348/806 |
| 2003/0123072 A1* | 7/2003 | Spronk | | 358/1.9 |
| 2003/0147564 A1 | 8/2003 | Lee | | |
| 2003/0190092 A1* | 10/2003 | Dyas et al. | | 382/298 |
| 2003/0194010 A1* | 10/2003 | Mukerjee et al. | | 375/240.16 |
| 2003/0215230 A1 | 11/2003 | Gallagher | | |
| 2003/0234866 A1* | 12/2003 | Cutler | | 348/207.1 |
| 2004/0120597 A1* | 6/2004 | Le Dinh | | 382/261 |
| 2004/0169724 A1* | 9/2004 | Ekpar | | 348/36 |
| 2004/0174446 A1* | 9/2004 | Acharya | | 348/279 |
| 2004/0247195 A1* | 12/2004 | Chauville et al. | | 382/254 |
| 2005/0001991 A1* | 1/2005 | Ulichney et al. | | 353/69 |
| 2005/0089241 A1* | 4/2005 | Kawanishi et al. | | 382/274 |
| 2005/0105822 A1* | 5/2005 | Narita | | 382/275 |
| 2005/0184993 A1* | 8/2005 | Ludwin et al. | | 345/502 |
| 2005/0226526 A1* | 10/2005 | Mitsunaga | | 382/274 |
| 2006/0007170 A1* | 1/2006 | Wilson et al. | | 345/173 |
| 2006/0056082 A1* | 3/2006 | Hung | | 359/819 |
| 2006/0188172 A1* | 8/2006 | Higurashi et al. | | 382/275 |
| 2007/0024638 A1* | 2/2007 | Hoppe et al. | | 345/606 |
| 2007/0025636 A1* | 2/2007 | Furukawa et al. | | 382/275 |
| 2007/0035706 A1* | 2/2007 | Margulis | | 353/122 |
| 2007/0182762 A1* | 8/2007 | Wu et al. | | 345/647 |
| 2008/0273812 A1* | 11/2008 | Fujita et al. | | 382/274 |
| 2008/0297360 A1* | 12/2008 | Knox et al. | | 340/628 |

FOREIGN PATENT DOCUMENTS

WO    WO20050926218    10/2005

OTHER PUBLICATIONS

An Embedded Camera Lens Distortion Correction Method for Mobile Computing Applicaitons, Wonpil Yu, IEEE Transactions on Consumer Electronics, vol. 49, No. 4, Nov. 2003.

* cited by examiner

DISTORTION CORRECTION OF IMAGES USING HYBRID INTERPOLATION TECHNIQUE

FIELD OF THE INVENTION

This invention generally relates to digital image processing and more specifically to correcting image distortions using a hybrid interpolation technique.

BACKGROUND ART

Lens systems generate distortions. One of the most visible distortions in today's medium cost camera products is a radial distortion. The radial distortion is generated in camera systems by a non-homogeneous transversal magnification on the whole surface of the lens, but is a function of the off-axis distance.

The radial distortion is a non-linear distortion that manifests itself in the image by a radial displacement of the image points from the center of the distortion. The radial distortion is more commonly called a barrel distortion or a pincushion distortion depending on the direction of the radial distortion. The radial distortion properties, such as a distortion effect and a center of distortion, depend on the optical characteristics of the lens system, which may change for example as a result of focusing or zooming.

FIGS. 1a through 1d, illustrate different visible effects of the radial distortion on a grid test image and showing: a) a non-distorted image, b) a distorted image with the barrel distortion, c) a distorted image with the pincushion distortion and d) a distorted image with a combined barrel and pincushion distortion.

DISCLOSURE OF THE INVENTION

According to a first aspect of the invention, a method for correcting a geometrical distortion of an image using a hybrid interpolation technique by a digital image processor, comprises the steps of: calculating corrected coordinates of pixels in the image; and interpolating color components of the pixels using the corrected coordinates, wherein at least one color component is interpolated using a quality interpolator which is different from quality interpolators used for other color components.

According further to the first aspect of the invention, out of the color components, the at least one color component may be a luminance color component (Y) and two other color components may be chrominance color components (U, V), wherein the quality interpolator for the luminance color component (Y) may be higher than the quality interpolators for the chrominance color components (U, V). Further, the quality interpolator of the luminance color component (Y) may be a bicubic interpolator, and the quality interpolator for the two chrominance color components (U, V) may be a bilinear interpolator.

Further according to the first aspect of the invention, all the color components may have different quality interpolators.

Still further according to the first aspect of the invention, the geometrical distortion may be a radial distortion.

According further to the first aspect of the invention, the calculating of the corrected coordinates may comprise the steps of: creating a look-up table for a correction function for a finite number of discrete values of at least one parameter, the correction function being a function of the at least one parameter; calculating the at least one parameter for each pixel of the image for the original pixel coordinates; choosing a value of the correction function calculated for one of the discrete values of the at least one parameter from the look-up table by matching the at least one calculated parameter with the one of the discrete values of the at least one parameter for each pixel using the look-up table; and computing the corrected coordinates of the pixels by using the chosen value of the correction function for the each pixel of the image. Further, the correction function may comprise a digital zoom factor so that digital zoom may be jointly performed with the correcting the geometrical distortion. Further still, the at least one parameter may be a squared radius, the radius being a distance between a location of a pixel and a center point of the distortion. Yet further still, the calculating the squared radius may be performed using at least one of: a double axial symmetry; and a single axial symmetry. Further, the calculating the squared radius may be performed using a differential radius square calculation.

According still further to the first aspect of the invention, wherein a digital zoom and the correcting the geometrical distortion may be performed jointly.

According to a second aspect of the invention, a computer program product comprising: a computer readable storage structure embodying computer program code thereon for execution by a computer processor with the computer program code characterized in that it includes instructions for performing the steps of the first aspect of the invention, indicated as being performed by any component or a combination of components of a digital image processor or of an electronic device comprising the digital image processor.

According to a third aspect of the invention, a digital image processor adapted for correcting a geometrical distortion of an image using a hybrid interpolation technique, comprises: a corrected coordinate calculation block, for calculating corrected coordinates of pixels in the image; and a hybrid interpolation block, for interpolating color components of the pixels using the corrected coordinates, wherein at least one color component is interpolated using a quality interpolator which is different from quality interpolators used for other color components.

According further to the third aspect of the invention, out of the color components, the at least one color component may be a luminance color component (Y) and two other color components are chrominance color components (U, V), wherein the quality interpolator for the luminance color component (Y) may be higher than the quality interpolators for the chrominance color components (U, V). Further, the quality interpolator of the luminance color component (Y) may be a bicubic interpolator, and the quality interpolator for the two chrominance color components (U, V) may be a bilinear interpolator.

According further to the third aspect of the invention, all the color components may have different quality interpolators.

Still further according to the third aspect of the invention, the geometrical distortion may be a radial distortion.

According further to the third aspect of the invention, the corrected coordinate calculation block may comprise: a LUT calculator block, for creating a look-up table for a correction function for a finite number of discrete values of at least one parameter, the correction function being a function of the at least one parameter; a parameter calculation means, for calculating the at least one parameter for each pixel of the image for the original pixel coordinates; a look-up table, for storing values of the correction function for the finite number of values of the at least one parameter, and for choosing a value of the correction function calculated for one of the discrete values of the at least one parameter by matching the at least one calculated parameter with the one of the discrete values of the at least one parameter for each pixel using the look-up table; and a corrected coordinate computation means, for computing the corrected coordinates of the pixels by using the chosen value of the correction function for the each pixel of the image. Further, the correction function may comprise a digital zoom factor so that digital zoom is jointly performed with the correcting the geometrical distortion. Further still, the at least one parameter may be a squared radius, the radius being a distance between a location of a pixel and a center point of the distortion. Yet further, the calculating the squared radius may be performed using at least one of: a double axial symmetry; and a single axial symmetry. Yet still further, the calculating the squared radius may be performed using a differential radius square calculation.

According still further to the third aspect of the invention, a digital zoom and the correcting the geometrical distortion may be performed jointly.

According to a fourth aspect of the invention, an electronic device adapted for correcting a geometrical distortion of an image using a hybrid interpolation technique, comprises: a camera, for generating an image; a digital image processor, comprises: a corrected coordinate calculation block, for calculating corrected coordinates of pixels in the image; and a hybrid interpolation block, for interpolating color components of the pixels using the corrected coordinates, wherein at least one color component is interpolated using a quality interpolator which is different from quality interpolators used for other color components.

According further to the fourth aspect of the invention, the electronic device may be a digital camera, a communication device, a wireless communication device, a portable electronic device, a mobile electronic device or a camera phone.

Further according to the fourth aspect of the invention, out of the color components, the at least one color component may be a luminance color component (Y) and two other color components may be chrominance color components (U, V), wherein the quality interpolator for the luminance color component (Y) may be higher than the quality interpolators for the chrominance color components (U, V). Further, the quality interpolator of the luminance color component (Y) may be a bicubic interpolator, and the quality interpolator for the two chrominance color components (U, V) may be a bilinear interpolator.

Still further according to the fourth aspect of the invention, all the color components may have different quality interpolators.

According further to the fourth aspect of the invention, the geometrical distortion may be a radial distortion.

According still further to the fourth aspect of the invention, the corrected coordinate calculation block may comprise: a LUT calculator block, for creating a look-up table for a correction function for a finite number of discrete values of at least one parameter, the correction function being a function of the at least one parameter; a parameter calculation means, for calculating the at least one parameter for each pixel of the image for the original pixel coordinates; a look-up table, for storing values of the correction function for the finite number of values of the at least one parameter, and for choosing a value of the correction function calculated for one of the discrete values of the at least one parameter by matching the at least one calculated parameter with the one of the discrete values of the at least one parameter for each pixel using the look-up table; and a corrected coordinate computation means, for computing the corrected coordinates of the pixels by using the chosen value of the correction function for the each pixel of the image. Further, the at least one parameter may be a squared radius, the radius being a distance between a location of a pixel and a center point of the distortion. Further still, the calculating the squared radius may be performed using at least one of: a double axial symmetry; and a single axial symmetry. Yet still further, the calculating the squared radius may be performed using a differential radius square calculation. Further still, the correction function may comprise a digital zoom factor so that digital zoom may be jointly performed with the correcting the geometrical distortion.

According further still to the fourth aspect of the invention, a digital zoom and the correcting the geometrical distortion may be performed jointly.

According to a fifth aspect of the invention, a method for correcting a geometrical distortion, comprises the steps of: creating a look-up table for a correction function for a finite number of discrete values of at least one parameter, the correction function being a function of the at least one parameter; calculating the at least one parameter for each pixel of the image for the original pixel coordinates; choosing a value of the correction function calculated for one of the discrete values of the at least one parameter from the look-up table by matching the at least one calculated parameter with the one of the discrete values of the at least one parameter for each pixel using the look-up table; and computing the corrected coordinates of the pixels by using the chosen value of the correction function for the each pixel of the image.

According further to the fifth aspect of the invention, the at least one parameter may be a squared radius, the radius being a distance between a location of a pixel and a center point of the distortion.

Further according to the fifth aspect of the invention, the calculating the squared radius may be performed using at least one of: a double axial symmetry; and a single axial symmetry.

Still further according to the fifth aspect of the invention, the calculating the squared radius may be performed using a differential radius square calculation.

According further to the fifth aspect of the invention, the correction function may comprise a digital zoom factor so that digital zoom is jointly performed with the correcting the geometrical distortion.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

A new method, apparatus and software product are presented for correcting a geometrical distortion of an image using a hybrid interpolation technique by a digital image processor. According to an embodiment of the present invention, after calculating corrected coordinates of pixels, the interpolation of color components of the pixels can be performed by using the corrected coordinates, wherein at least one color component is interpolated using a quality interpolator which is different from quality interpolators used for other color components (it is noted, that the quality interpolators for the other color components can be identical or can differ from each other). More specifically, if a YUV color space is used, the at least one color component can be a luminance color component (Y), wherein the quality interpolator of the luminance color component (Y) can be a bicubic interpolator, and the quality interpolator for the two chrominance color components (U, V) can be a bilinear interpolator.

According to an embodiment of the present invention, a radial distortion generated by the lens system of a camera can be compensated using the hybrid interpolation technique. Moreover, the radial distortion can be represented by a curve that can be modeled, for example, as a polynomial function. This polynomial function can be used for calculating the pixel displacement generated by the radial distortion. Then, an inverse mapping technique (e.g., using a look-up table) can be used for generating the new pixel coordinates in the distorted input image. After that a two-dimensional (2D) interpolation method can be applied to calculate the pixel value at the new coordinate.

The main advantage of the geometrical correction for the radial distortion is a more realistic geometry, such that an object having straight lines is captured in an image, which still can reproduce the straight lines.

Novelties in a specific algorithm, according to embodiments of the present invention, comprise (but are not limited to):

1. The hybrid interpolation technique for the YUV color space (and other color space formats) using, e.g., a separated luminance chrominance channels;
2. LUT (look-up table) using shifted radius squared (or other parameters) as a table index;
3. Reduced amount of calculation by using symmetry properties; and
4. Reduced calculation latency by calculating the radius square differentially.

All these novelties are described below in more detail.

Figure 1A:
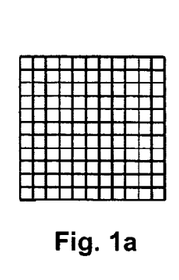
FIGS. 1a through 1d are schematic representations of effects of radial distortion on a grid test image with: a) a non-distorted image, b) a distorted image with a barrel distortion, c) a distorted image with a pincushion distortion and d) a distorted image with a combined barrel and pincushion distortion.
Figure 1B:
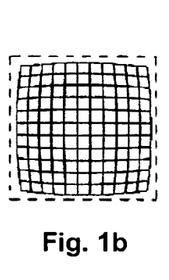
Figure 1C:
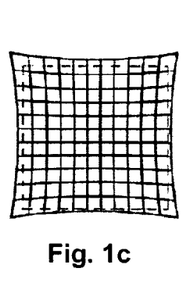
Figure 1D:
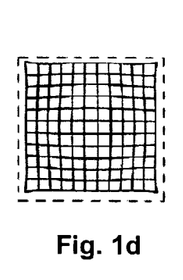
Figure 2:
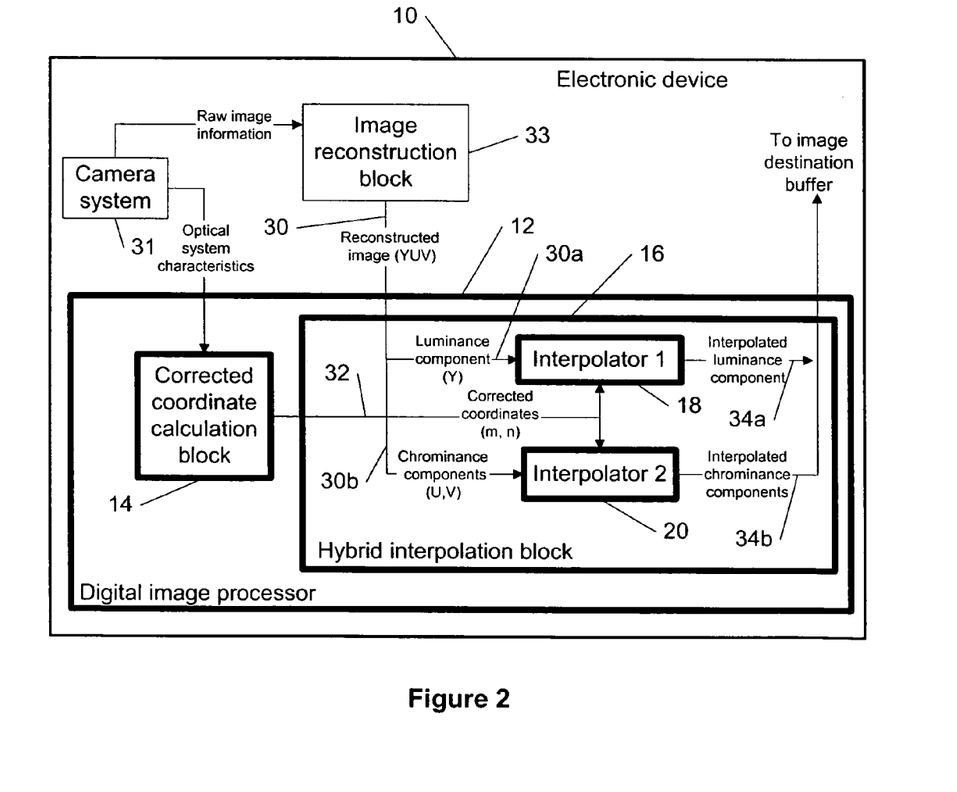
FIG. 2 is a block diagram demonstrating correction of a geometrical distortion of an image using a hybrid interpolation technique by a digital image processor in an electronic device, according to an embodiment of the present invention.

FIG. 2 is a block diagram demonstrating correction of a geometrical distortion of an image using a hybrid interpolation technique by a digital image processor 12 in an electronic device 10, according to an embodiment of the present invention.

A corrected coordinate calculation block 14 generates and provides corrected pixel coordinates m and n (signal 32), using optical system characteristics (e.g., lens position information, liquid lens change, etc., e.g., as a result of performing autofocus or zoom) from a camera system 31, to first and second interpolators 18 and 20 of the hybrid interpolation block 16. The interpolators 18 and 20 provide interpolated luminance and chrominance components (signals 34a and 34b, respectively) for each pixel in the image to an image destination buffer. These interpolated components are generated by the blocks 18 and 20 using inputs from an image reconstruction block 33, which provides (using raw image information from the camera system) a luminance component Y (see signal 30a) and chrominance components U and V (see signal 30b) to blocks 18 and 20, respectively and using the corrected coordinates m and n provided by the block 14 (signal 32).

According to an embodiment of present invention, the blocks 31, 33, 14, 16, 18, and 20 can be implemented as a software, a hardware block or a combination thereof. Furthermore, each of the blocks 31, 33, 14, 16, 18, and 20 can be implemented as a separate block or can be combined with one another or any other block of the electronic device 10 or it can be split into several blocks according to their functionality.

The implementation of the geometrical correction algorithm by the processor 12 can comprise (but not be limited to) the following features:

- Creation of a look-up table holding the correction value for a discrete set of radius squared values (a radius being a distance between a location of a pixel and a center point of the distortion);
- Differential calculation of radius squared from output image pixel coordinates.
- Input image pixel coordinates calculation from output image pixel coordinates value and look-up table value retrieval; and
- New pixel value calculation by the hybrid interpolation block.

Figure 4:
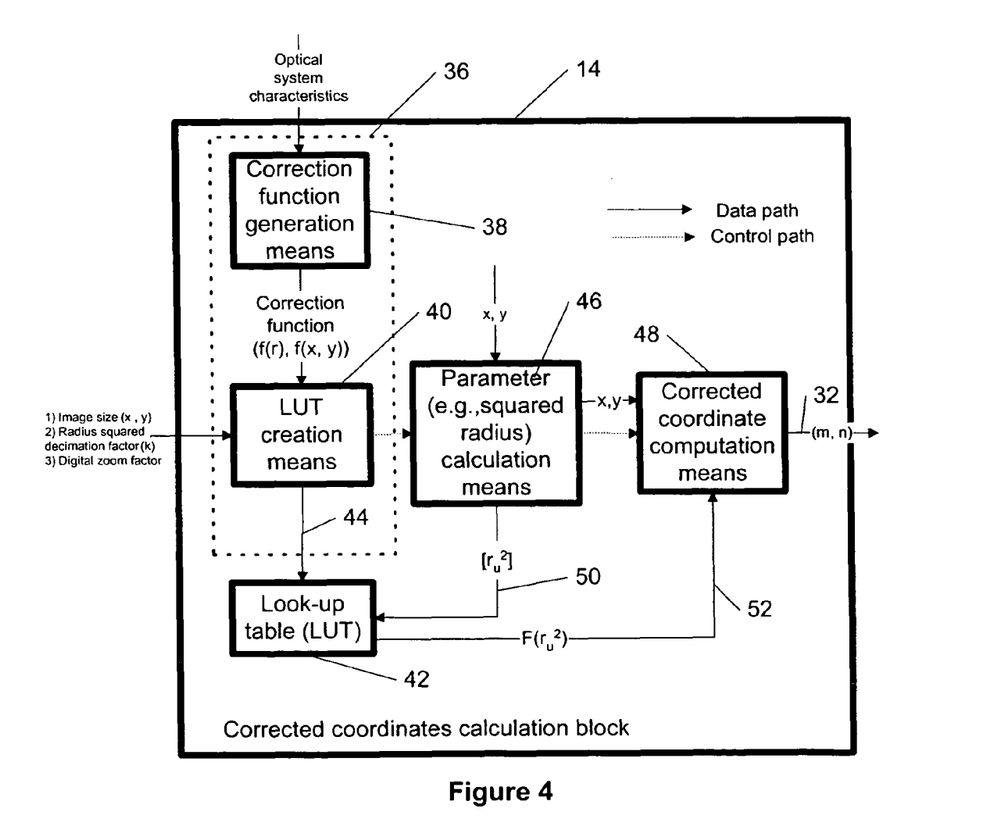
FIG. 4 is a block diagram demonstrating a performance of the corrected coordinate calculation block, according to an embodiment of the present invention.

Detailed performance of the blocks 14 and 16 is described in more details below. FIG. 4 provides a more detailed description of the performance of the block 14.

Figure 3:
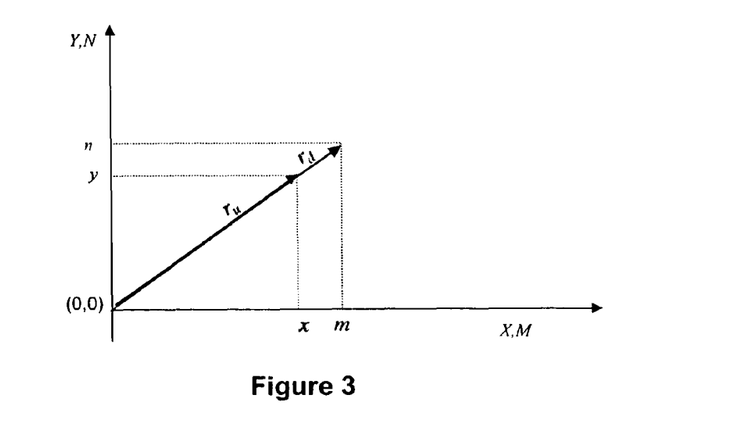
FIG. 3 is a graph describing geometrical phenomenon of a radial distortion.

For each pixel, a set of coordinate (x, y) is defined, according to their position compared to the center of the distortion as seen in FIG. 3. This set of coordinates is used for calculating the current undistorted radius $r_u$ as follows:

$$r_u = \sqrt{(x^2 + y^2)} \quad (1).$$

The distorted radius $r_d$ defined by the coordinates m and n (as shown in FIG. 3) is then calculated as follows:

$$r_d = r_u \cdot f(r_u) \quad (2),$$

wherein $f(r_u)$ is the distortion function which can be for example a polynomial with coefficients $a_k$ defined as:

$$f(r_u) = \sum_{i=0}^{i=I} a_i \cdot r_u^i, \quad (3)$$

where, I is the degree of the polynomial. It is noted that other types of suitable functions (not necessarily polynomial) can be used as well.

Then, the coordinates of the distorted pixels are given by:

$$m = x \cdot f(r_u) \quad (4a), \text{ and}$$

$$n = y \cdot f(r_u) \quad (4b).$$

The coordinates of the distorted pixel (m,n) do not match the output pixel integer grid of x and y; therefore a hybrid interpolation technique performed by the block 16 shown in FIG. 2 is needed to get the new intensity value of the pixel at (x, y).

One possibility is to operate the block 16 using a novel hybrid technique for interpolation in the YUV4:4:4 color space. YUV color space properties are well known. It is know, for example, that the luminance channel, Y, provides more information about the image content to a human eye than the chrominance channels U and V. This is mainly the reason why video compression algorithms sub-sample the U and V channels.

The same philosophy is carried out here. If the luminance channel is providing more information, then it would be logical to interpolate this luminance channel with a better interpolating kernel than the chrominance channels U and V.

The solution, according to an embodiment of the present invention, is to interpolate the luminance channel Y using the interpolator 18 (see FIG. 2) having better interpolation property, while U and V channels are interpolated by the second interpolator 20 using a lower quality interpolating kernel, as shown in FIG. 2. For example, the Y channel can be interpolated with a bi-cubic interpolating kernel while U and V channels are interpolated with a bilinear interpolator. Another possibility is to utilize a bilinear interpolation for the Y channel and a nearest neighborhood interpolation for the U and V channels.

This technique can be applied to all formats where the luminance channel is separated from the chrominance channels. The channels can be also sub-sampled; i.e., for example, this scheme is valid for the color space YUV4:4:4, YUV4:2:2, YUV 4:2:0, etc. Also other color space formats can be used, e.g., YCbCr, which is a scaled version of the YUV color space, wherein Cb and Cr channels are equivalent to U and V channels, respectively It is noted that in principle, RGB (red, green, blue) can be also used in the implementation of the interpolation, according to embodiments of the present invention. In this case, the component mostly affecting the luminance could be interpolated with better interpolation than other components. The component mostly affecting the luminance for the RGB color space is usually green.

It is noted that it is possible to select the geometrical correction function so that digital zoom can be applied jointly with geometric correction without increasing the number of computational operations.

Interpolating techniques typically require extra computations when interpolating the pixels near image borders, since the interpolation may need pixels outside of the image area. These pixels need to be somehow computed. By selecting a suitable geometrical correction function, this extra computation can be simply avoided. This can be done, for example, by selecting the geometrical correction function such that a digital zoom factor slightly larger than one is applied in correction.

Furthermore, in terms of computation, the technique using the hybrid interpolation for the YUV color space gives the possibility to have an image quality close to the one provided by e.g. the Key's bi-cubic interpolation, while having a processing cycle count between the bilinear and bi-cubic interpolation. This new hybrid YUV interpolation techniques gives more flexibility to the traditional interpolation methods, by avoiding the blurring from bilinear interpolation and still having a low number of computations to execute, with almost two times faster execution than the bi-cubic interpolation.

It is further noticed that, according to an embodiment of the present invention, the implementation can be also used with one image frame buffer, if the input and the output images are spatially delayed in the memory. In this case, the output image lines can be written on top of the input image lines without losing information for the further processing of the following lines.

FIG. 4 shows an example among others of a block diagram demonstrating a detailed performance of the corrected coordinate calculation block 14, according to an embodiment of the present invention. FIG. 4 depicts a LUT (look-up table) calculator block 36, comprising: a) a correction function generation means 38 for generating a correction function, e.g., given by Equation 3 and b) a LUT creation means 40 for creating a look-up table for the correction function for a finite number of discrete values of the parameter (or parameters), e.g., the square radius, wherein the correction function being a function of said parameter (or the parameters).

The block 14 further comprises a parameter calculation means 46, for calculating the parameter (or parameters), e.g., the square radius, of the correction function for each pixel of the image for the original pixel coordinates; a look-up table (LUT) 42, for storing said correction function for the finite number of values of the parameter (or parameters), and for choosing (see signal 52) the value of the correction function by matching the calculated parameter or parameters provided by the block 46 (see signal 50) with one of the discrete values of the parameter for each pixel using the look-up table; and a corrected coordinate computation means 48, for computing the corrected coordinates m and n (see signal 32) of the pixels by using the chosen value of the correction function for each pixel in the image.

Since the square root calculation for each pixel is quite expensive in terms of computation, according to an embodiment of the present invention, the value of $f(r_u)$ can be retrievable through the form $f(r_u) @ r_u^2$. Then the distortion factor will still be valid for finding m and n using Equation 4a and 4b. The technique can be further explained as follows.

From Equation 3, it follows that:

$$r_d = r_u(s) \cdot f(r_u(s)) = \sum_{i=0}^{I} a_i \cdot \left(\sqrt{s}\right)^{i+1}, \quad (5)$$

wherein $r_u(s)=\sqrt{s}$.

By combining Equations 4a, 4b and 5, it is possible to obtain $$m = x \cdot \frac{r_d}{r_u} = x \cdot F(s) = x \cdot \frac{f(r_u(s))}{r_u} \text{ and} \quad (6a)$$

$$n = y \cdot \frac{r_d}{r_u} = y \cdot F(s) = y \cdot \frac{f(r_u(s))}{r_u}. \quad (6b)$$

A discrete set of values for the function F(s) can be efficiently stored in a look-up-table (LUT). Each look-up-table element of the LUT can be calculated, e.g., as follows:

$$LUT[i]=F(i \cdot 2^k) \quad (7),$$

wherein i is the look-up-table index and $2^k$ is the step size in sampling the function h(s).

The LUT generated this way can be accessed by the following indexing method: LUT [(s+2^{k-1})>>k], in a pseudo code, where >> identifies the right shift operation and s is the squared radius $r^2$.

It is noted, according to an embodiment of the present invention, that the correction function can change (i.e., to be updated) when, e.g., the optical system characteristics change, and then the LUT is recalculated for the updated correction function.

It is further noted that, according to an embodiment of the present invention, the LUT can be calculated in such a way that the digital zoom can be applied at the same time when the geometric correction is performed. Combining the digital zoom feature with the geometrical correction function can provide a significant improvement in terms of reducing the computation cost.

According to an embodiment of the present invention, for radial distortion correction, the polynomial form function that utilizes radius can be the most suitable, but for some other effects on images, such as warping, other mappings from (x,y) to (m,n) can be used. Therefore, in general, the correction function provided by the block 38 can have a general dependence of the function f(x, y) as $$\begin{bmatrix} m \\ n \end{bmatrix} = f\left( \begin{bmatrix} x \\ y \end{bmatrix} \right). \tag{7a}$$

According to further embodiments of the present invention, the following novelties can speed up the correction process by calculating the radius square values by the block 46 for several pixels having the same radius value.

Figures 5A, 5B:
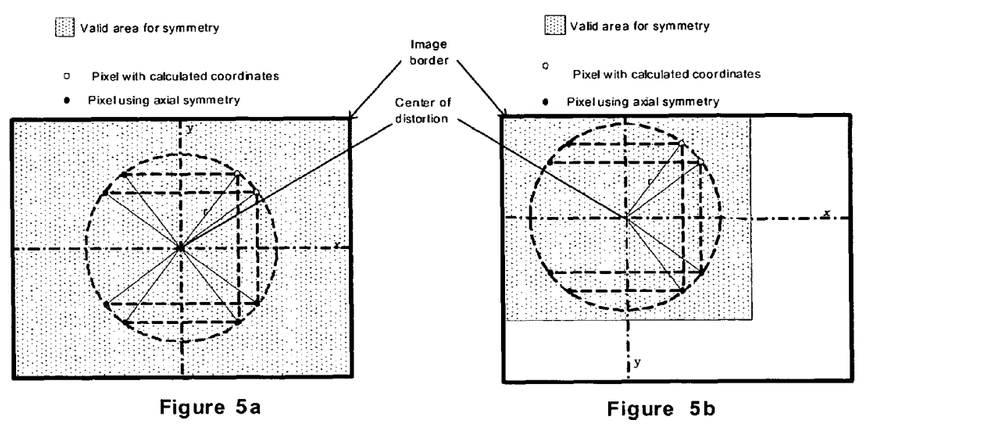
FIGS. 5a and 5b are a schematic representation demonstrating the principle of a double axial symmetry and radial symmetry property used for faster implementation: a) center of the distortion coincides with the center of the image; b) center of the distortion does not coincide with the center of the image, according to an embodiment of the present invention.

As mentioned above, the center for distortion is not necessarily the center of the image. However, it is advantageous to use the symmetry offered by the radial property. Considering the center of the distortion as the center of symmetry, double axial and central symmetry can be used for defining the distortion value for pixels having the same absolute value for x-axis and y-axis coordinates. FIGS. 5a and 5b show examples demonstrating the principle of a double axial symmetry and radial symmetry property used for faster implementation in the algorithm: a) center of the distortion coincides with the center of the image; b) center of the distortion does not coincide with the center of the image, according to an embodiment of the present invention.

Figure 6:
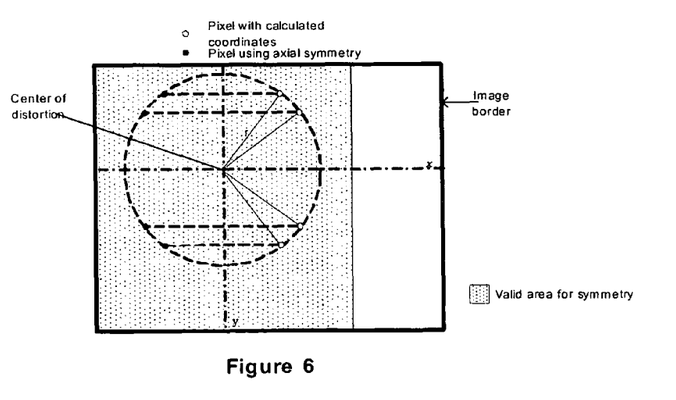
FIG. 6 is a schematic representation demonstrating the principle of a single axial symmetry and radial symmetry property used for a line block processing algorithm case, according to an embodiment of the present invention.

For systems requiring a low memory consumption or when using line block processing, the symmetry can be limited only to the y-axis axial symmetry. In this case, according to an embodiment of the present invention, the symmetry provided by the x-axis will not be valid, and the central symmetry will be replaced by the y-axis symmetry. FIG. 6 illustrates this principle.

There are several advantages of using symmetry; which include (but are not limited to):

1) The number of radius squared calculations can be reduced, since the same radius squared value can be used at the symmetrical pixel positions;
2) The number of look-up-table accesses can be reduced, since the same LUT value can be used at the symmetrical pixel positions; and
3) The amount of calculations to determine the interpolation coefficients for the interpolation (e.g., bicubic or bilinear) is reduced, since the same interpolation coefficients can be re-used at the symmetrical pixel positions.

In order to retrieve the distortion factor (i.e., the value of the distortion function) from the look-up table (e.g., using the block 42 in FIG. 4), it is necessary to calculate the radius square position ($r_p^2$) of the pixel located at ($x_p$, $y_p$) related to the center of the distortion as follows:

$$r_p^2 = x_p^2 + y_p^2 \tag{8}$$

Considering that computing $y_p^2 = y_p \cdot y_p$ is not expensive due to its calculation once every line, it can be calculated straightforwardly. However, a different calculation can be derived for the part involving $x_p$. A differential addition can provide the same result as $x_p^2 = x_p \cdot x_p$ with lower computational complexity.

Then, according to an embodiment of the present invention, considering the following formula relating two neighbouring pixels on the same line as $$r^2_{x,y} = r^2_{x-1,y} + 2x - 1 \tag{9}$$

it is possible to derive a formula involving the two previous pixels on the same line as follows:

$$r^2_{x,y} = r^2_{x-1,y} + (r^2_{x-1,y} - r^2_{x-2,y}) + 2 \tag{10}$$

This technique could avoid multiplication on processors having long operation latency for multiplication. $r^2_{x,y}$ can then be used (see the signal 50 in FIG. 4) for retrieving the correction function value (the signal 52), which will be used, e.g., in Equations 4a and 4b for computing the corrected coordinates m and n for each pixel by the block 48.

Figure 7:
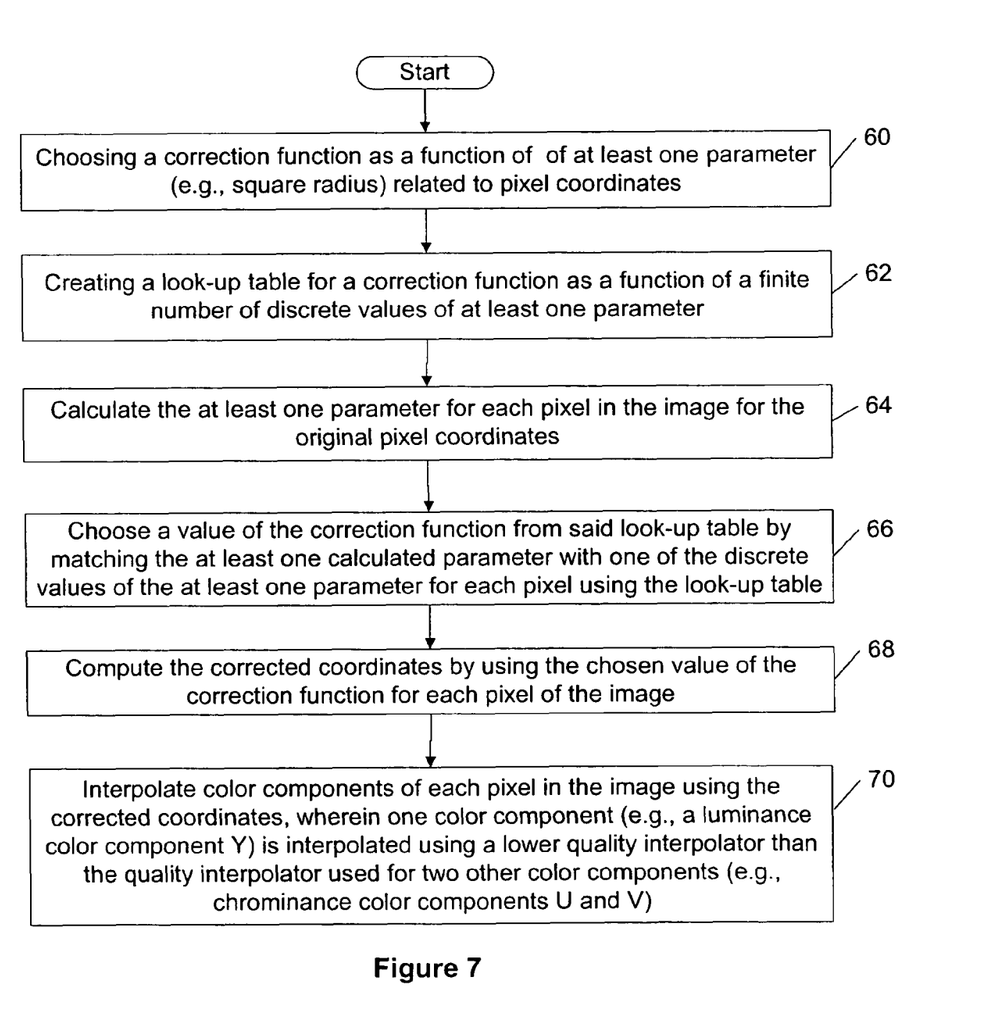
FIG. 7 is a flow chart demonstrating correction of a geometrical distortion of an image using a hybrid interpolation technique by a digital image processor, according to an embodiment of the present invention.

FIG. 7 shows a flow chart demonstrating correction of the geometrical distortion of the image using the hybrid interpolation technique, e.g., by the digital image processor 12, according to an embodiment of the present invention.

The flow chart of FIG. 7 only represents one possible scenario among others. In a method according to an embodiment of the present invention, in a first step 60, a correction function as a function of at least one parameter (e.g., square radius) related to the pixel coordinates is chosen by the block 38.

In a next step 62 a look-up table for the correction function as a function of a finite number of discrete values of the at least one parameter is created using the block 40. In a next step 64, the at least one parameter (e.g., the square radius) for each pixel in the image for the original pixel coordinates is calculated by the block 46. In a next step 66, the value of the correction function is chosen from the look-up table (the block 42) by matching the at least one calculated parameter (e.g., the square radius) with one of the discrete values of the at least one parameter for each pixel using the look-up table. In a next step 68, the corrected coordinates are computed by the block 48 using the chosen value of the correction function for each pixel of the image. It is noted that the correction function can change (i.e., to be updated) when, e.g., the optical system characteristics change, and then the LUT is recalculated for the updated correction function.

Finally, in a next step 70, the color components of each pixel in the image using the corrected coordinates are interpolated using the block 16, wherein one color component (e.g., a luminance color component Y) is interpolated using a lower quality interpolator than the quality interpolator used for two other color components (e.g., chrominance color components U and V).

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
    using a first array of pixels for an image to calculate corrected coordinates of a second array of pixels for a corrected image wherein the corrected coordinates correct a geometrical distortion of the image caused by a non-optimal lens system in a camera; and
    interpolating, by a digital image processor, color components of the first array of pixels using said corrected coordinates and a hybrid interpolation technique, wherein at least one color component of the first array of pixels is interpolated using a quality interpolator which is different from quality interpolators used for other color components of the first array of pixels, wherein the aspect ratio of the image is maintained in the corrected image.

2. The method of claim 1, wherein out of said color components, said at least one color component is a luminance color component and two other color components are chrominance color components, wherein the quality interpolator for the luminance color component is of higher quality than the quality interpolators for the chrominance color components.

3. The method of claim 2, wherein the quality interpolator of said luminance color component is a bicubic interpolator, and the quality interpolator for the two chrominance color components is a bilinear interpolator.

4. The method of claim 1, wherein all said color components have different quality interpolators.

5. The method of claim 1, wherein said geometrical distortion caused by a non-optimal lens system in a camera is a radial distortion.

6. The method of claim 1, wherein said calculating of the corrected coordinates comprises:
    creating a look-up table for a correction function for a finite number of discrete values of at least one parameter, said correction function being a function of said at least one parameter;
    calculating said at least one parameter for each pixel of said image for the original pixel coordinates;
    choosing a value of said correction function calculated for one of the discrete values of the at least one parameter from said look-up table by matching said at least one calculated parameter with said one of the discrete values of the at least one parameter for each pixel using said look-up table; and
    computing said corrected coordinates of the pixels by using said chosen value of the correction function for said each pixel of said image.

7. The method of claim 6, wherein said correction function comprises a digital zoom factor so that digital zoom is jointly performed with said correcting said geometrical distortion caused b a non-optimal lens system in a camera.

8. The method of claim 6, wherein said at least one parameter is a squared radius, said radius being a distance between a location of a pixel and a center point of the distortion.

9. The method of claim 8, wherein said calculating said squared radius is performed using at least one of:
    a double axial symmetry; and
    a single axial symmetry.

10. The method of claim 8, wherein said calculating said squared radius is performed using a first previously calculated squared radius for a first preceding pixel and using a second previously calculated squared radius for a second preceding pixel.

11. The method of claim 1, wherein a digital zoom and said correcting said geometrical distortion caused by a non-optimal lens system in a camera are performed jointly.

12. A non transitory computer program product comprising: a computer readable storage structure embodying computer program code thereon configured to be executed by a computer processor, wherein said computer program code comprises instructions for performing the method of claim 1, indicated as being performed by any component or a combination of components of a digital image processor or of an electronic device comprising said digital image processor.

13. A digital image processor, comprising:
    a corrected coordinate calculation block, configured to use a first array of pixels for an image to calculate corrected coordinates of a second array of pixels for a corrected image wherein the corrected coordinates correct a geometrical distortion of the image caused by a non-optimal lens system in a camera; and
    a hybrid interpolation block, configured to interpolate color components of the first array of pixels using said corrected coordinates and a hybrid interpolation technique, wherein the hybrid interpolation block is configured to interpolate at least one color component of the first array of pixels using a quality interpolator which is different from quality interpolators used for other color components of the first array of pixels, wherein the aspect ratio of the image is maintained in the corrected image.

14. The digital image processor of claim 13, wherein out of said color components, said at least one color component is a luminance color component and two other color components are chrominance color components, wherein the quality interpolator for the luminance color component is of higher quality than the quality interpolators for the chrominance color components.

15. The digital image processor of claim 14, wherein the quality interpolator of said luminance color component is a bicubic interpolator, and the quality interpolator for the two chrominance color components is a bilinear interpolator.

16. The digital image processor of claim 13, wherein all said color components have different quality interpolators.

17. The digital image processor of claim 13, wherein said geometrical distortion caused by a non-optimal lens system in a camera is a radial distortion.

18. The digital image processor of claim 13, wherein said corrected coordinate calculation block comprises:
    a look up table calculator block, for creating a look-up table for a correction function for a finite number of discrete values of at least one parameter, said correction function being a function of said at least one parameter;
    a parameter calculation means, for calculating said at least one parameter for each pixel of said image for the original pixel coordinates;
    a look-up table, for storing values of said correction function for the finite number of values of said at least one parameter, and for choosing a value of said correction function calculated for one of the discrete values of the at least one parameter by matching said at least one calculated parameter with said one of the discrete values of the at least one parameter for each pixel using said look-up table; and a corrected coordinate computation means, for computing said corrected coordinates of the pixels by using said chosen value of the correction function for said each pixel of said image.

19. The digital image processor of claim 18, wherein said correction function comprises a digital zoom factor so that digital zoom is jointly performed with said correcting said geometrical distortion caused by a non-optimal lens system in a camera.

20. The digital image processor of claim 18, wherein said at least one parameter is a squared radius, said radius being a distance between a location of a pixel and a center point of the distortion.

21. The digital image processor of claim 20, wherein said calculating said squared radius is performed using at least one of:
   a double axial symmetry; and
   a single axial symmetry.

22. The digital image processor of claim 20, wherein said calculating said squared radius is performed using a first previously squared radius for a first preceding pixel and using a second previously calculated squared radius for a second preceding pixel.

23. The digital image processor of claim 13, wherein a digital zoom and said correcting said geometrical distortion caused by a non-optimal lens system in a camera are performed jointly.

24. An electronic device, comprising:
   a camera, configured to generate an image;
   a digital image processor, comprising:
   a corrected coordinate calculation block, configured to use a first array of pixels for an image to calculate corrected coordinates of a second array of pixels for a corrected image wherein the corrected coordinates correct a geometrical distortion of the image caused by a non-optimal lens system in the camera; and
   a hybrid interpolation block, configured to interpolate color components of the first array of pixels using said corrected coordinates and a hybrid interpolation technique, wherein the hybrid interpolation block is configured to interpolate at least one color component of the first array of pixels using a quality interpolator which is different from quality interpolators used for other color components of the first array of pixels, wherein the aspect ratio of the image is maintained in the corrected image.

25. The digital image processor of claim 13, wherein said digital image processor is a part of a digital camera, a communication device, a wireless communication device, a portable electronic device, a mobile electronic device or a camera phone.

26. The electronic device of claim 24, wherein out of said color components, said at least one color component is a luminance color component and two other color components are chrominance color components, wherein the quality interpolator for the luminance color component is of higher quality than the quality interpolators for the chrominance color components.

27. The electronic device of claim 26, wherein the quality interpolator of said luminance color component is a bicubic interpolator, and the quality interpolator for the two chrominance color components is a bilinear interpolator.

28. The electronic device of claim 24, wherein all said color components have different quality interpolators.

29. The electronic device of claim 24, wherein said geometrical distortion caused by a non-optimal lens system in the camera is a radial distortion.

30. The electronic device of claim 24, wherein said corrected coordinate calculation block comprises:
   a look up table calculator block, for creating a look-up table for a correction function for a finite number of discrete values of at least one parameter, said correction function being a function of said at least one parameter;
   a parameter calculation means, for calculating said at least one parameter for each pixel of said image for the original pixel coordinates;
   a look-up table, for storing values of said correction function for the finite number of values of said at least one parameter, and for choosing a value of said correction function calculated for one of the discrete values of the at least one parameter by matching said at least one calculated parameter with said one of the discrete values of the at least one parameter for each pixel using said look-up table; and
   a corrected coordinate computation means, for computing said corrected coordinates of the pixels by using said chosen value of the correction function for said each pixel of said image.

31. The electronic device of claim 30, wherein said at least one parameter is a squared radius, said radius being a distance between a location of a pixel and a center point of the distortion.

32. The electronic device of claim 31, wherein said calculating said squared radius is performed using at least one of:
   a double axial symmetry; and
   a single axial symmetry.

33. The electronic device of claim 31, wherein said calculating said squared radius is performed using a first previously calculated squared radius for a first preceding pixel and using a second previously calculated squared radius for a second preceding pixel.

34. The electronic device of claim 30, wherein said correction function comprises a digital zoom factor so that digital zoom is jointly performed with said correcting said geometrical distortion caused by a non-optimal lens system in the camera.

35. The electronic device of claim 24, wherein a digital zoom and said correcting said geometrical distortion caused by a non-optimal lens system in the camera are performed jointly.

36. An electronic device, comprising:
   means for generating an image;
   processing means, comprising:
   means for using a first array of pixels for an image to calculate corrected coordinates of a second array of pixels for a corrected image wherein the corrected coordinates correct a geometrical distortion of the image caused by a non-optimal lens system in a camera; and
   means for interpolating color components of the first array of pixels using said corrected coordinates and a hybrid interpolation technique, wherein at least one color component of the first array of pixels is interpolated using a quality interpolator which is different from quality interpolators used for other color components of the first array of pixels, wherein the aspect ratio of the image is maintained in the corrected image.

37. The electronic device of claim 36, wherein said means for generating an image is a camera, said processing means is a digital image processor, said means for calculating is a corrected coordinate calculation block, and said means for interpolating is a hybrid interpolation block.

38. A method comprising:
   digitally correcting for a geometric distortion in an image by changing the position of pixels; and performing, by a digital image processor, a hybrid interpolation to produce a final image wherein for pixels of the final image a first colour component is interpolated using a first interpolator and a second colour component is interpolated using a second interpolator, wherein the first and second colour components are different and the first and second interpolators are of different quality and the first interpolator is of higher duality than the second interpolator.

39. The method of claim 38 wherein the aspect ratio of the image is maintained when correcting for a geometric distortion.

\* \* \* \* \*

UNITED STATES PATENT AND TRADEMARK OFFICE
CERTIFICATE OF CORRECTION

| | | |
|---|---|---|
| PATENT NO. | : 7,881,563 B2 | Page 1 of 1 |
| APPLICATION NO. | : 11/355919 | |
| DATED | : February 1, 2011 | |
| INVENTOR(S) | : A. Mandy et al. | |

It is certified that error appears in the above-identified patent and that said Letters Patent is hereby corrected as shown below:

Column 11, line 60 (claim 07, line 4), "b" should be --by--.

Column 12, line 09 (claim 12, line 1), "non transitory" should be --non-transitory--.

Column 16, line 01 (claim 38, line 11), "duality" should be --quality--.

Signed and Sealed this
Twenty-seventh Day of September, 2011

David J. Kappos
*Director of the United States Patent and Trademark Office*